US012771481B2

(12) United States Patent
Dong

(10) Patent No.: US 12,771,481 B2
(45) Date of Patent: Oct. 20, 2026

(54) COMMUNICATION METHODS UNDER MULTIPLE LINKS AND ELECTRONIC APPARATUS

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 455 days.

(21) Appl. No.: 18/276,531

(22) PCT Filed: Feb. 9, 2021

(86) PCT No.: PCT/CN2021/076143

§ 371 (c)(1),
(2) Date: Aug. 9, 2023

(87) PCT Pub. No.: WO2022/170448

PCT Pub. Date: Aug. 18, 2022

(65) Prior Publication Data

US 2023/0421299 A1 Dec. 28, 2023

(51) Int. Cl.
*H04L 1/1607* (2023.01)

(52) U.S. Cl.
CPC .................................. *H04L 1/1614* (2013.01)

(58) Field of Classification Search
CPC .............................. H04L 1/1614; Y02D 30/70
See application file for complete search history.

(56) References Cited

U.S. PATENT DOCUMENTS

| | | | | |
|---|---|---|---|---|
| 8,325,689 | B2 * | 12/2012 | Kuskin | H04L 1/0083 370/349 |
| 8,332,472 | B2 | 12/2012 | Tian et al. | |
| 2010/0268777 | A1 | 10/2010 | Tian et al. | |
| 2012/0254319 | A1 | 10/2012 | Wheeler | |
| 2018/0206174 | A1 * | 7/2018 | Zhou | H04B 1/0483 |

FOREIGN PATENT DOCUMENTS

| | | | |
|---|---|---|---|
| CN | 101345638 | A | 1/2009 |
| CN | 105790896 | A | 7/2016 |
| CN | 109076391 | A | 12/2018 |
| CN | 110199549 | A | 9/2019 |
| CN | 110913415 | A | 3/2020 |
| CN | 111066271 | A | 4/2020 |
| CN | 112074020 | A | 12/2020 |
| JP | H11196117 | A | 7/1999 |

(Continued)

OTHER PUBLICATIONS

ISA State Intellectual Property Office of the People's Republic of China, International Search Report Issued in Application No. PCT/CN2021/076143, Sep. 28, 2021, WIPO, 4 pages.

(Continued)

*Primary Examiner* — Jamal Javaid
(74) *Attorney, Agent, or Firm* — Volpe Koenig

(57) ABSTRACT

A communication method, including: determining a first message frame under any link of the multiple links, wherein the first message frame includes a multi-link information element, and the multi-link information element includes first information on data fragment transmission; and transmitting the first message frame.

18 Claims, 2 Drawing Sheets

(56) References Cited

FOREIGN PATENT DOCUMENTS

| | | | |
|---|---|---|---|
| WO | 2021006545 | A1 | 1/2021 |
| WO | 2021011476 | A1 | 1/2021 |

OTHER PUBLICATIONS

State Intellectual Property Office of the People's Republic of China, Office Action and Search Report Issued in Application No. 202180000386.4, Feb. 19, 2025, 15 pages.
ISA State Intellectual Property Office of the People's Republic of China, Written Opinion of the International Searching Authority Issued in Application No. PCT/CN2021/076143, Aug. 8, 2022, WIPO, 7 pages.
Bamdeb, "Block Acknowledgement(BA)", https://wifisharks.com/block-acknowledgement, Dec. 26, 2020, 10 pages.

* cited by examiner

Fragment Number subfield encoding for Compressed Block Ack
| Fragment Number subfield | | | Fragmentation level 3 (ON/OFF) | Block Ack Bitmap subfield length ( byte ) | Maximum number of MSDUs/ A-MSDUs that can be acknowledged |
|---|---|---|---|---|---|
| B3 | B2-B1 | B0 | | | |
| 0 | 0 | 0 | OFF | 8 | 64 |
| 0 | 1 | 0 | | Reserved | Reserved |
| 0 | 2 | 0 | | 32 | 256 |
| 0 | 3 | 0 | | Reserved | Reserved |
| 0 | 0 | 1 | ON | 8 | 16 |
| 0 | 2 | 1 | | 32 | 64 |
| 1 | 0 | 0 | OFF | 64 | 512 |
| 1 | 1 | 0 | | 128 | 1 024 |
| 1 | 2 and 3 | 0 | | Reserved | Reserved |
| 0 | 1 | 1 | ON | 64 | 128 |
| 0 | 3 | 1 | | 128 | 256 |
FIG. 3
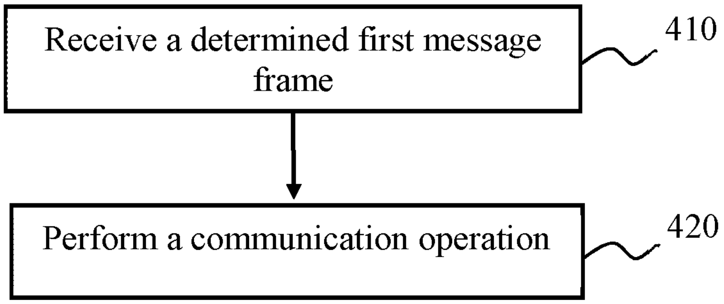
FIG. 4
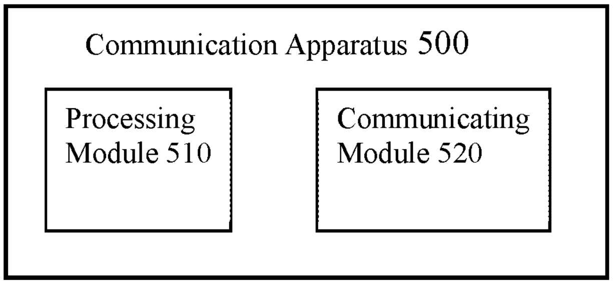
FIG. 5

COMMUNICATION METHODS UNDER MULTIPLE LINKS AND ELECTRONIC APPARATUS

CROSS REFERENCE TO RELATED APPLICATIONS

This application is a National Stage of International Application No. PCT/CN2021/076143, filed on Feb. 9, 2021, the disclosure of which is incorporated herein by reference in its entirety for all purposes.

BACKGROUND

At present, the research scope of wireless fidelity (Wi-Fi) technology includes 320 MHz bandwidth transmission, aggregation and collaboration of multiple frequency bands, etc., and the rate and throughput are expected to be improved by at least four times compared with the existing standard. Main application scenarios include video transmission, augmented reality (AR), virtual reality (VR), etc.

The aggregation and collaboration of multiple frequency bands refer to performing simultaneous communication between devices in 2.4 GHz, 5.8 GHz, and 6-7 GHz frequency bands. A new media access control (MAC) mechanism needs to be defined to manage the simultaneous communication between devices in the multiple frequency bands. In addition, a low latency transmission is also expected to be supported in the aggregation and collaboration of multiple frequency bands.

At present, a maximum bandwidth which will be supported by the aggregation of multiple frequency bands and system technology is 320 MHz (160 MHz+160 MHz), and 240 MHz (160 MHz+80 MHz) and other bandwidths may also be supported.

SUMMARY

The present disclosure relates to the field of communication, and in particular to communication methods and communication apparatuses under multi-link.

According to an embodiment of the present disclosure, there is provided a communication method under multiple links, including: determining a first message frame under any link of the multiple links, where the first message frame includes a multi-link information element, and the multi-link information element includes information on data fragment transmission; and transmitting the first message frame.

According to an embodiment of the present disclosure, there is provided a communication method under multiple links, including: receiving a determined first message frame, where the first message frame includes a multi-link information element, and the multi-link information element includes information on data fragment transmission; and performing a communication operation based on the first message frame.

According to an embodiment of the present disclosure, there is provided an electronic apparatus, including: a memory, a processor, and a computer program stored on the memory and operable on the processor. The processor implements the methods described above when executing the computer program.

BRIEF DESCRIPTION OF THE DRAWINGS

The above and other features of the embodiments of the present disclosure will be more apparent by describing the embodiments of the present disclosure in detail with reference to the accompanying drawings, in which:

FIG. 3 shows an exemplary setting of a block acknowledgement bitmap according to an embodiment of the present disclosure.

FIG. 4 is a flowchart illustrating another communication method according to an embodiment of the present disclosure.

FIG. 5 is a block diagram illustrating a communication apparatus according to an embodiment of the present disclosure.

DETAILED DESCRIPTION OF THE EMBODIMENTS

Figure 1:
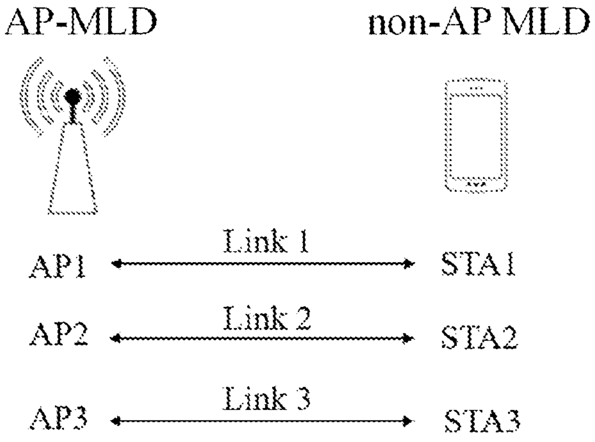
FIG. 1 is an exemplary diagram illustrating a communication scenario under multi-link according to an embodiment of the present disclosure.

The following description, with reference to the accompanying drawings, is provided to fully understand the various embodiments of the present disclosure as defined by the appended claims and their equivalents. The various embodiments of the present disclosure include various specific details, but such specific details are considered to be exemplary only. In addition, descriptions of well-known techniques, functions, and constructions may be omitted for the sake of clarity and brevity.

Terms and words used in the present disclosure are not limited to written meanings, but are used by inventors to enable a clear and consistent understanding of the present disclosure. Therefore, for those skilled in the art, the description of various embodiments of the present disclosure is provided only for the purpose of illustration, but not for the purpose of limitation.

It should be understood that "a", "an", "said", and "the" in singular forms used herein can also include plural forms, unless clearly indicated in the context otherwise. It should be further understood that the word "include" used in the present disclosure refers to the existence of described features, integers, steps, operations, elements, and/or assemblies, but does not exclude the existence or addition of one or more other features, integers, steps, operations, elements, assemblies, and/or groups thereof.

It will be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled' to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

Unless otherwise defined, all terms used herein, including technical terms and scientific terms, have the same meaning as generally understood by those skilled in the art to which the present disclosure belongs.

In some embodiments, a station (STA) and an access point (AP) can be a multi-link device (MLD), which supports a capability to send and/or receive simultaneously under multi-link at the same time. Therefore, in some embodiments, there can be multi-link between the STA and the AP, and the communication between the two devices under multi-link is being studied.

In some embodiments, in order to support the reliability of data, data is transmitted in fragments. In data fragment transmission of some embodiments, it is supported that a maximum number of MAC service data units (MSDUs) or aggregation-MSDUs (A-MSDUs) acknowledgement is 16 or 64. In addition to achieving compatibility with the existing technology, it is also necessary to support a maximum number of 1024 or 512 MSDUs/A-MSDUs acknowledgements.

FIG. 1 is an exemplary diagram illustrating a communication scenario under multi-link.

In a wireless local area network (WLAN), a basic service set (BSS) can include an access point (AP) and one or more stations (STAs) that communicate with the AP. A BSS can be connected to a distribution system (DS) through its AP, and then connected to another BSS, to form an extended service set (ESS).

The AP is a wireless switch used for the wireless network and is a core of the wireless network. The AP device can be used as a wireless base station and is mainly used as a bridge to connect the wireless network and a wired network. With this AP, the wired and wireless networks can be integrated. The AP may include software applications and/or circuitries to enable other types of nodes in the wireless network to communicate with the outside and inside of the wireless network via the AP. For example, the AP can be a terminal device or a network device equipped with a wireless fidelity (Wi-Fi) chip.

For example, the STAs may include, but are not limited to: cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices, and the like.

In some embodiments of the present disclosure, the AP and the STA may be devices supporting multi-link (multi-link devices, MLDs), which may, for example, be denoted as AP MLD and Non-AP MLD, respectively. For ease of description, in the following context, an example of communication between an AP and an STA under the multi-link is primarily described, which is not limited in some embodiments.

In FIG. 1, by way of illustration only, an AP MLD may be an AP supporting a multi-link communication function, and a Non-AP MLD may be an STA supporting a multi-link communication function. As illustrated in FIG. 1, the AP MLD may operate on three links, such as AP1, AP2, and AP3 illustrated in FIG. 1, and the Non-AP MLD may also operate on three links, such as STA1, STA2, and STA3. In the example in FIG. 1, it is assumed that AP1 and STA1 communicate through a corresponding first link, Link 1. Similarly, AP2 and AP3 communicate with STA2 and STA3 through a second link, Link 2, and a third link, Link 3, respectively. In addition, Link 1 to Link 3 can be multiple links at different frequencies, such as links at 2.4 GHz, 5 GHz, 6 GHZ, etc., or several links with the same or different bandwidths at 2.4 GHz, 5 GHZ, 6 GHZ. In addition, multiple channels can exist under each link. However, it should be understood that the communication scenario shown in FIG. 1 is only exemplary, and the concept of the present disclosure is not limited to this. For example, an AP MLD can be connected to multiple Non-AP STA MLDs, or in each link, an AP can communicate with multiple other types of STAs.

Traffic identification (TID) can correspond to different upper-layer services and quality of service (QoS) requirements, and services (data) corresponding to the TID can be mapped to multi-link for transmission. For example, at least one TID can be mapped to the first link, Link 1, to the third link, Link 3 shown in FIG. 1, to transmit the services corresponding to the TID. However, this is only exemplary, and the present disclosure is not limited to this. For example, the TID can be mapped to a part of multiple links supported by the device.

In order to perform data fragment transmission to support the reliability of data, it is necessary to define a capability of a device to support fragmentation. According to the technical concept provided by the embodiments of the present disclosure, a signaling support bit supporting the fragmentation can be newly defined, which will be described in detail with reference to FIG. 2.

Figure 2:
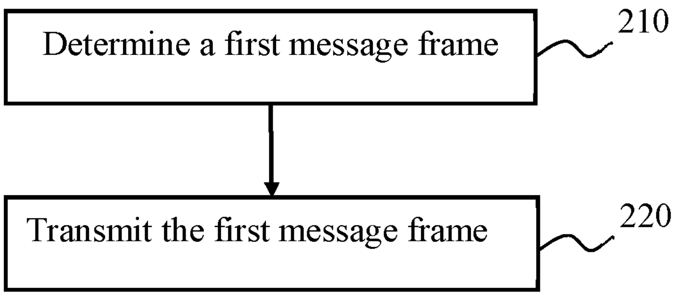
FIG. 2 is a flowchart illustrating a communication method according to an embodiment of the present disclosure.

FIG. 2 is a flowchart illustrating a communication method under multi-link according to an embodiment of the present disclosure. The communication method shown in FIG. 2 can be applied to a sender device. The sender device can be, for example, an access point multi-link device (AP MLD) as shown in FIG. 1.

Referring to FIG. 2, in operation step 210, a first message frame is determined under any link of the multi-link. According to an embodiment of the present disclosure, the multi-link is one or more links to which a TID is mapped. In an embodiment of the present disclosure, there are many ways to determine the first message frame. For example, the sender device can generate the first message frame based on at least one of the following conditions: network condition, load condition, hardware capability of a sender/receiver device, service type, and relevant protocol provisions. There are no specific restrictions on this in the embodiments of the present disclosure. In an embodiment of the present disclosure, the sender device can also obtain the first message frame from an external device, and there are no specific restrictions on this in the embodiments of the present disclosure. In an embodiment of the present disclosure, the first message frame can be one of the following: a beacon frame, a probe request frame (unicast or broadcast), an association response frame, and a re-association response frame. However, the present disclosure is not limited to this, and other frames capable of transmitting messages are also feasible.

According to an embodiment of the present disclosure, the first message frame may include a multi-link (ML) information element. According to an embodiment of the present disclosure, the ML information element can be used in a process of establishing the multi-link, and identify various capability information supported by the device. For example, the ML information element can include information on data fragment transmission. That is, the technical concept of the present disclosure is to define a fragment signaling support bit of the sender device in the ML information element. As an example, the format of the ML information element included in the first message frame may be as shown in Table 1 below.

TABLE 1

| | Element ID | Length | Element ID Extension | Multi-Link Control | Common Info | Link Info |
|---|---|---|---|---|---|---|
| Byte(Octet) | 1 | 1 | 1 | 2 | variable | variable |

Referring to Table 1, ML information element can include: an element ID field, a length field, an element ID extension field, a multi-link control field, a common information (namely, common info) field, and/or a link info (namely, link information) field. It will be understood that the number of bytes in each field is not limited to the values shown in Table 1, and various changes can be made according to actual applications. Among them, the ML information element also identifies the capability information values supported by the multi-link devices, such as supporting MIMO (multiple input multiple output) and dynamic data fragment.

For the convenience of description, the ML information element shown in Table 1 is only exemplary, and the present disclosure is not limited to this. The ML information element can include more or less content, and it can be understood that each element shown in Table 1 exists independently. These elements are listed in the same table as examples, but it does not mean that all elements in the table must exist simultaneously according to the table. The value of each element is independent of any other element values in Table 1. Therefore, those skilled in the art can understand that the value of each element in the disclosed table is an independent embodiment.

According to an embodiment of the present disclosure, one or more fragment support bits of the sender device can be defined in the multi-link control field and/or the common information field of the ML information element.

For example, the information on data fragment transmission included in the multi-link information element can include a first flag bit configured to indicate that data fragmentation is supported. The first flag bit can be included in the multi-link control field of the multi-link information element. According to an embodiment of the present disclosure, in the case where the first flag bit is set to the first value (for example, 1), it is indicated that dynamic data fragmentation is supported. Alternatively, in the case where the first flag bit is set to the second value (for example, 0), it is indicated that the dynamic data fragmentation is not supported.

For example, the information on data fragment transmission included in the multi-link information element can include a second flag bit configured to indicate that a dynamic fragmentation type is supported. For example, the dynamic fragmentation type is one of a first level dynamic fragment, a second level dynamic fragment, or a third level dynamic fragment. According to an embodiment of the present disclosure, the second flag bit can be included in the common information field of the multi-link information element. As an example only, the second flag bit may have at least two bits, where the second flag bit is set to a third value (for example, 01) configured to indicate that the first level dynamic fragment is supported, the second flag bit is set to a fourth value (for example, 10) configured to indicate that the second flag bit is supported, and the second flag bit is set to a fifth value (for example, 11) configured to indicate that the third level dynamic fragment is supported.

It will be understood that the multi-link information element does not necessarily include both the first and second flag bits mentioned above. For example, when only the second flag bit is included, the first flag bit can be omitted, and the default sender device supports dynamic data fragmentation. In addition, although the above embodiments describe that the first flag bit and the second flag bit are respectively included in different fields of the multi-link information element, the present disclosure is not limited to this. Additionally, the first flag bit and the second flag bit can also be included in the same field or in other fields.

In addition, the information about data fragment transmission included in the multi-link information element may also include a maximum number of fragmented MAC service data units (MSDUs) or aggregation-MSDUs (A-MSDUs) exponent subfield and a minimum fragment size subfield. According to an embodiment of the present disclosure, the maximum number of fragmented MSDUs or A-MSDUs exponent subfield and the minimum fragment size subfield can be included in the common information field of the multi-link information element. The meanings and roles of the maximum number of fragmented MSDUs or A-MSDUs exponent subfield and the minimum fragment size subfield can be described in Table 2 below.

TABLE 2

| Subfield | Definition | Code |
|---|---|---|
| Maximum Number Of Fragmented MSDUs/A-MSDUs Exponent | The subfield is configured to indicate that the maximum number of fragmented MSDUs or A-MSDUs (if supported by a receiver) can be continuously received by STA. | If dynamic fragment identification is supported (for example, the first identification bit is greater than 0): except that the value of this subfield (such as 7) is configured to indicate that the maximum number of fragmented MSDUs or A-MSDUs that are not limited, the maximum number of fragmented MSDUs or A-MSDUs defined in this subfield is: $N_{max} = 2^{Maximum\ Number\ Of\ Fragmented\ MSDUs/A\text{-}MSDUs\ Exponent}$ If the dynamic fragment identification is not supported (for example, the first identification bit is 0), the subfield is reserved. |
| Minimum Fragment Size | The subfield is configured to indicate that the minimum frame size (bytes) of a first fragment of the MSDUs and A-MSDUs (if supported) or | If the dynamic fragment identification is supported (for example, the first identification bit is greater than 0): the subfield is set to 0, indicating that there is no minimum frame size; the subfield is set to 1, indicating that the minimum frame size is 128 bytes; the subfield is set to 2, indicating that the minimum frame size is 256 bytes; |

TABLE 2-continued

| Subfield | Definition | Code |
|---|---|---|
| | MMPDU supported by the receiver STA | the subfield is set to 3, indicating that the minimum frame size is 512 bytes. If the dynamic fragment identification is supported (for example, the first identification bit is greater than 0), the subfield is reserved. |

According to an embodiment of the present disclosure, the first message frame may include a high efficiency (HE) capability information element in addition to a multi-link information element. The HE capability information element can also include support flag bits for dynamic fragment. For example, the HE capability information element may include a first flag bit and/or a second flag bit having the same settings as the multi-link information element. That is, the settings of the first flag bit and/or the second flag bit in the HE capability information element can be the same as those in the multi-link information element. Therefore, for a receiver device (such as a legacy site) that cannot parse the multi-link information element, the HE capability information element can be parsed to obtain dynamic fragment support capability information of the sender device. In other words, backward compatibility can be realized. As an example, the first flag bit and the second flag bit can be included in the HE MAC capability field.

According to an embodiment of the present disclosure, one bit (the first flag bit) in the multi-link control field can be used to identify whether other subfields supporting fragment exist. For example, if the bit (the first flag bit) is set to "0", it means that there are no other subfields supporting fragment. That is, the subsequent setting information about the fragment (for example, the second flag bit, the maximum number of fragmented MSDUs or A-MSDUs exponent subfield) does not exist or are all reserved bits. For example, if the bit (the first flag bit) is set to "1", it means that there are other subfields supporting the fragment (for example, the second flag bit, the maximum number of fragmented MSDUs or A-MSDUs exponent subfield).

According to an embodiment of the present disclosure, since block acknowledgement (Block Ack, BA) in the MSDUs or A-MSDUs can be MLD level, a bit (the second flag bit) in the common information field can be used to identify whether the device supports dynamic fragment. As an example, two bits in the common information field can be used to identify that dynamic fragment is supported. For example, "01" identifies the first level dynamic fragment is supported, and "10" identifies that the second level fragment is supported, and "11" identifies that the third level fragment is supported. In addition, when the BA mechanism is established, it can be identified in the add block acknowledgement information element that it supports dynamic fragment. For example, the HE fragmentation operation subfield can be reused, which will be described in detail later with reference to Table 3 and Table 4.

According to an embodiment of the present disclosure, in order to realize subsequent compatibility of the AP, the AP may include dynamic fragmentation support flag bits (for example, the first flag bit, the second flag bit, the maximum number of fragmented MSDUs or A-MSDUs exponent subfield, and/or the minimum fragment size subfield) in the ML information element of the first message frame. For example, the first message frame may be a beacon frame, a detection request (unicast or broadcast) frame, or (re) association request frame. At the same time, the first message frame can also contain the HE capability information element, the HE MAC capability contains the dynamic fragmentation support flag bits, and the values set by the dynamic fragmentation support flag bits are the same.

Referring back to FIG. 2, in step 220, the first message frame can be transmitted. For the convenience of description, a link for transmitting the first message frame in step 220 may be the same as the link for determining the first message frame in step 210. However, this is only exemplary, and the present disclosure is not limited to this. For example, the link for determining the first message frame in step 210 and the link for sending the first message frame in step 220 may also be different. The sender device can notify the receiver device of its dynamic fragmentation support capability information by sending the information about data fragment transmission carried in the ML information element of the first message frame. Thus, the receiver device can perform communication based on the dynamic fragmentation support capability supported by the sender device, for example, data transmission.

If the ML information element of the first message frame supports dynamic fragment, it will have a corresponding impact on the information frame in the block acknowledgement (BA) mechanism. According to an embodiment of the present disclosure, the communication method shown in FIG. 2 may further include transmitting a second message frame (not shown). The second message frame may include information configured to indicate dynamic fragmentation transmission in the block acknowledgement mechanism. For example, the second message frame may be sent at different stages of the BA mechanism, and in different stages, the second message frame may indicate different frames.

In an embodiment of the present disclosure, the second message frame may be transmitted during a BA mechanism setup process, in which case the second message frame may be a block acknowledgement (Block Ack) response frame. According to an embodiment of the present disclosure, the second message frame may include an add BA (ADDBA) extension information element, and information supporting dynamic fragment may be identified in the ADDBA extension information element. For example, the ADDBA extension information element may have an exemplary format as shown in Table 3 below.

TABLE 3

| | Element ID | Length | ADDBA Additional Parameter Set |
|---|---|---|---|
| Byte(Octet) | 1 | 1 | 1 |

Referring to Table 3, the ADDBA extension information element can include: an element ID, a length, and an ADDBA additional parameter set.

The ADDBA extension information element can include HE fragmentation operation parameters. For example, the HE fragmentation operation parameters can be included in the ADDBA additional parameter set in Table 3. According to an embodiment of the present disclosure, the ADDBA additional parameter set can have an exemplary format as shown in Table 4 below.

TABLE 4

| | No-Fragmentation | HE Fragmentation Operation | Reserved | Extended Buffer Size |
|---|---|---|---|---|
| Byte(Octet) | 1 | 1 | 2 | 3 |

Referring to Table 4, the ADDBA additional parameter set can include a no-fragmentation subfield, a HE fragmentation operation subfield, a reserved subfield, and an extended buffer size.

According to an embodiment of the present disclosure, the HE fragmentation operation subfield of the ADDBA additional parameter set can include HE fragmentation operation parameters, which can include supported dynamic fragmentation types. For example, the setting of the HE fragmentation operation subfield can be the same as the setting of the second flag bit in the multi-link information element of the first message frame. For example, the HE fragmentation operation subfield can be set to "01" to support the first-level dynamic fragment, can be set to "10" to support the second-level fragment, and can be set to "11" to support the third-level fragment.

In another embodiment of the present disclosure, the second message frame can be transmitted during a data transmission and block acknowledgement (Data & Block Ack) stages, in which case the second message frame may be a block acknowledgement (Block Ack) frame. For example, for convenience of description, a block acknowledgement frame as the second message frame may have the form of a compressed block acknowledgement. However, the present disclosure is not limited to this, and other forms of block acknowledgement frames are also feasible. The BA information field of a compressed block acknowledgement frame can have the format shown in Table 5 below.

TABLE 5

| Block Ack Starting Sequence Control | Block Ack Bitmap |
|---|---|

Referring to Table 5, a BA information field of the compressed block acknowledgement frame can include a block acknowledgement starting sequence control subfield and a block acknowledgement bitmap subfield.

According to an embodiment of the present disclosure, the length of the block acknowledgement bitmap subfield included in the second message frame (for example, a compressed block acknowledgement frame) can be set corresponding to the maximum number of fragmented MSDUs or A-MSDUs. For example, if the length of the block acknowledgement bitmap subfield is set to 64 bytes, the maximum number of corresponding MSDUs or A-MSDUs is 128; if the length of the block acknowledgement bitmap subfield is set to 128 bytes, the maximum number of corresponding MSDUs or A-MSDUs is 256. It will be understood that the numerical values here are only illustrative examples, and the present disclosure is not limited to this. For example, as shown in FIG. 3, the block acknowledgement bitmap subfield can also be set to other lengths, corresponding to other numbers of MSDUs or A-MSDUs.

According to an embodiment of the present disclosure, the fragment number of the starting sequence control subfield, the length of the block acknowledgement bitmap subfield, and the maximum number of MSDU or A-MSDU can be set accordingly, as shown in FIG. 3. It will be understood that the content shown in FIG. 3 is only an exemplary implementation of the present disclosure, and can be adaptively modified based on the actual transmission situation of MSDU or A-MSDU. It will be understood that the settings of each value shown in FIG. 3 are only exemplary, and the embodiments disclosed in the present disclosure are not limited to making various feasible modifications to the values therein.

FIG. 4 is a flowchart illustrating another communication method according to an embodiment of the present disclosure. The communication method shown in FIG. 4 can be applied to a receiver device. For example, the receiver device can be a Non-AP STA MLD.

Referring to FIG. 4, in step 410, a determined first message frame can be received. The first message frame can include a multi-link information element. The multi-link information element can include information on data fragment transmission. According to an embodiment of the present disclosure, the multi-link information element may have the format shown in Table 1 as described above, and repeated descriptions are omitted herein for clarity.

According to an embodiment of the present disclosure, the information on data fragment transmission in the multi-link information element included in the first message frame may include a first flag bit configured to indicate that data fragmentation is supported. For example, in a case where the first flag bit is set to a first value, the first flag bit is configured to indicate that dynamic data fragmentation is supported; in a case where the first flag bit is set to a second value, the first flag bit is configured to indicate that the dynamic data fragmentation is not supported. Therefore, according to an embodiment of the present disclosure, the first flag bit can be included in a multi-link control field of the multi-link information element.

According to an embodiment of the present disclosure, the information on data fragment transmission in the multi-link information element included in the first message frame may include a second flag bit configured to indicate that a dynamic fragmentation type is supported. For example, the dynamic fragmentation type can include one of a first-level dynamic fragmentation, a second-level dynamic fragmentation, and a third-level dynamic fragmentation. Therefore, according to an embodiment of the present disclosure, the second flag bit can be included in a common information field of the multi-link information element.

According to an embodiment of the present disclosure, the information on data fragment transmission in the multi-link information element included in the first message frame may include a maximum number of fragmented MAC service data units (MSDUs) or aggregation-MSDUs (A-MSDUs) exponent subfield and a minimum fragment size subfield. For example, the maximum number of fragmented MSDUs or A-MSDUs exponent subfield and the minimum fragment size subfield are included in a common information field of the multi-link information element.

According to an embodiment of the present disclosure, the first message frame may further include a high efficiency capability information element. The high efficiency capability information element may include a first flag bit, a second flag bit, a maximum number of fragmented MSDUs or A-MSDUs exponent subfield, and/or a minimum fragment size subfield having the same settings as the first flag bit, the second flag bit, the maximum number of fragmented MSDUs or A-MSDUs exponent subfield, and/or the minimum fragment size subfield in the multi-link information element.

It will be understood that the first flag bit, the second flag bit, the maximum number of fragmented MSDUs or A-MSDUs exponent subfield, the minimum fragment size subfield, the multi-link information element, and the high efficiency capability information element mentioned in FIG. 4 can be similar to the description in step 210 of FIG. 2 and Table 1 and Table 2 above, and repeated descriptions are omitted herein for clarity.

In step 420, a communication operation can be performed based on the first message frame. For example, the receiver device can parse the first message frame to obtain capability information on data fragment transmission of a sender device, and perform service (data) transmission according to the capability information.

The communication method shown in FIG. 4 is only exemplary, and the present disclosure is not limited to this. For example, the communication method shown in FIG. 4 may further include receiving a second message frame, not shown, where the second message frame includes information indicating data fragment transmission in a block acknowledgement (Block Ack, BA) mechanism. The second message frame can be received at different stages of the BA mechanism, and the second message frame can indicate different frames at different stages.

For example, at a BA setup stage, the second message frame can be a block acknowledgement (Block Ack) response frame. In this case, the second message frame can include an add BA extension information element. The add BA extension information element can include one or more high efficiency fragmentation operation parameters, which include supported dynamic fragmentation types.

For example, at a data transmission and block acknowledgement stage, the second message frame can be a compressed block acknowledgement frame. In this case, the second message frame may include a block acknowledgement bitmap subfield, where a length of the block acknowledgement bitmap subfield is set corresponding to a maximum number of fragmented MSDUs or A-MSDUs. For example, if the length of the block acknowledgement bitmap subfield is set to 64 bytes, the maximum number of corresponding MSDUs or A-MSDUs is 128. If the length of the block acknowledgement bitmap subfield is set to 128 bytes, the maximum number of corresponding MSDUs or A-MSDUs is 256. It will be understood that the numerical values herein are only illustrative explanations, and the present disclosure is not limited to this. For example, as shown in FIG. 3, the block acknowledgement bitmap subfield can also be set to other lengths, thereby corresponding to other numbers of MSDUs or A-MSDUs.

The description of the second message frame in FIG. 4 can be similar to the embodiments described above with reference to Tables 3 to 4 and FIG. 3, and repeated descriptions are omitted herein for clarity.

FIG. 5 is a block diagram illustrating a communication apparatus 500 according to an embodiment of the present disclosure. Referring to FIG. 5, the communication apparatus 500 may include a processing module 510 and a communicating module 520. The communication apparatus 500 shown in FIG. 5 can be applied to a sender device or a receiver device.

According to an embodiment, the communication apparatus 500 shown in FIG. 5 can be applied to the sender device, for example, an access point multi-link device (AP MLD) shown in FIG. 1. In this case, the processing module 510 can be configured to determine a first message frame under any link of multiple links. Where the first message frame includes a multi-link information element, and the multi-link information element includes information on data fragment transmission. The communicating module 520 can be configured to transmit the first message frame. That is, the communication apparatus 500 can perform the communication method described with reference to FIG. 2. For simplicity, repeated descriptions are omitted herein. In addition, communicating module 520 can also be configured to transmit a second message frame, where the second message frame includes information indicating data fragment transmission in a block acknowledgement (Block Ack, BA) mechanism. The second message frame can be transmitted at different stages of the BA mechanism, and the second message frame can indicate different frames at different stages.

The communication apparatus 500 shown in FIG. 5 can also be applied to the receiver device, for example, a Non-AP STA MLD shown in FIG. 1. In this case, communicating module 520 can be configured to receive a determined first message frame, where the first message frame includes a multi-link information element, and the multi-link information element includes information on data fragment transmission. The processing module 510 can be configured to perform a communication operation based on the first message frame. For example, the processing module 510 can parse the first message frame received by the communicating module 520 and control the communicating module 520 to perform the communication operation based on the information included in the first message frame. In this case, the communication apparatus 500 can perform the communication method described with reference to FIG. 4. For simplicity, repeated descriptions are omitted herein. In addition, the communicating module 520 can also be configured to receive a second message frame, where the second message frame includes information indicating data fragment transmission in a block acknowledgement (Block Ack, BA) mechanism. The second message frame can be received at different stages of the BA mechanism, and the second message frame can indicate different frames at different stages.

For example, at a BA setup stage, the second message frame can be a block acknowledgement (Block Ack) response frame. In this case, the second message frame can include an add BA extension information element. The add BA extension information element can include one or more high efficiency fragmentation operation parameters, which include supported dynamic fragmentation types.

For example, at a data transmission and block acknowledgement stage, the second message frame can be a compressed block acknowledgement frame. In this case, the second message frame may include a block acknowledgement bitmap subfield, where a length of the block acknowledgement bitmap subfield is set corresponding to a maximum number of fragmented MSDUs or A-MSDUs. For example, if the length of the block acknowledgement bitmap subfield is set to 64 bytes, the maximum number of corresponding MSDUs or A-MSDUs is 128. If the length of the block acknowledgement bitmap subfield is set to 128 bytes, the maximum number of corresponding MSDUs or A-MSDUs is 256. It will be understood that the numerical values herein are only illustrative explanations, and the present disclosure is not limited to this. For example, as shown in FIG. 3, the block acknowledgement bitmap subfield can also be set to other lengths, thereby corresponding to other numbers of MSDUs or A-MSDUs.

The description of the second message frame herein can be similar to that described above with reference to Tables 3 to 4 and FIG. 5. For simplicity, repeated descriptions are omitted herein.

In addition, the communication apparatus 500 shown in FIG. 5 is only exemplary, and the embodiments of the present disclosures are not limited to this. For example, the communication apparatus 500 may also include other modules, such as a memory module, etc. In addition, the various modules in the communication apparatus 500 can be combined into a more complex module or divided into more individual modules.

Through defining a signaling support bit supporting the fragmentation, and defining the length of the bitmap and the maximum number of MSDUs or A-MSDUs supported by BA, the communication methods and the communication apparatus under multi-link according to the embodiment of the present disclosure can be applicable to communication under multi-link and improve the reliability of data.

Based on the same principle as the methods provided in the embodiments of the present disclosure, an embodiment of the present disclosure also provides an electronic apparatus, which includes a processor and a memory. The memory stores machine-readable instructions (also referred to as "a computer program"). The processor is configured to execute the machine-readable instructions to implement the methods described with reference to FIGS. 2 and 4.

An embodiment of the present disclosure also provides a computer-readable storage medium, on which a computer program is stored. When the computer program is executed by the processor, the methods described with reference to FIGS. 2 and 4 can be implemented.

In some embodiments, the processor may be a logic block, a module, and a circuit for implementing or executing various examples described in connection with the present disclosure, for example, a central processing unit (CPU), a generic processor, a digital signal processor (DSP), an application specific integrated circuit (ASIC), a field programmable gate array (FPGA) or other programmable logic devices, transistor logic devices, hardware components, or any combination thereof. The processor can also be a combination that implements computing functions, for example, a combination of one or more microprocessors, or a combination of the DSP and the microprocessor.

In some embodiments, the memory may be, for example, a read only memory (ROM), a random access memory (RAM), an electrically erasable programmable read only memory (EEPROM), a compact disc read only memory (CD-ROM) or other optical disc storage, an optical disk storage (including compact disk, laser disk, optical disk, digital versatile disk, Blu-ray disk, etc.), a magnetic disc storage medium or other magnetic storage devices, or any other medium that can be used to carry or store program codes in the form of instructions or data structures and can be accessed by a computer, but is not limited to this.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the present disclosure has been shown and described with reference to certain embodiments thereof, it will be understood by those skilled in the art that various changes in form and details can be made without departing from the scope of the present disclosure. Therefore, the scope of the present disclosure should not be limited to the embodiments, but should be defined by the appended claims and their equivalents.

According to an aspect of the present disclosure, there is provided a communication method under multiple links, including: determining a first message frame under any link of the multiple links, wherein the first message frame includes a multi-link information element, and the multi-link information element includes information on data fragment transmission; and transmitting the first message frame.

In an embodiment, the information includes a first flag bit configured to indicate that data fragmentation is supported, wherein in a case where the first flag bit is set to a first value, the first flag bit is configured to indicate that dynamic data fragmentation is supported; wherein in a case where the first flag bit is set to a second value, the first flag bit is configured to indicate that the dynamic data fragmentation is not supported.

In an embodiment, the first flag bit is included in a multi-link control field of the multi-link information element.

In an embodiment, the information includes a second flag bit configured to indicate that a dynamic fragmentation type is supported.

In an embodiment, the dynamic fragmentation type includes one of a first level dynamic fragmentation, a second level dynamic fragmentation, and a third level dynamic fragmentation.

In an embodiment, the second flag bit is included in a common information field of the multi-link information element.

In an embodiment, the first message frame further includes a high efficiency capability information element, wherein the high efficiency capability information element includes a first flag bit and/or a second flag bit having the same settings as the first flag bit and/or the second flag bit in the multi-link information element.

In an embodiment, the information includes a maximum number of fragmented MAC service data units (MSDUs) or A-MSDUs exponent subfield and a minimum fragment size subfield.

In an embodiment, the maximum number of fragmented MSDUs or aggregation-MSDUs (A-MSDUs) exponent subfield and the minimum fragment size subfield are included in a common information field of the multi-link information element.

In an embodiment, the communication method further includes: transmitting a second message frame, wherein the second message frame includes information indicating data fragment transmission in a block acknowledgement mechanism.

In an embodiment, the second message frame includes an add block acknowledgement extension information element, wherein the add block acknowledgement extension information element includes one or more high efficiency fragmentation operation parameters, which include supported dynamic fragmentation types.

In an embodiment, the second message frame includes a block acknowledgement bitmap subfield, wherein a length of the block acknowledgement bitmap subfield is set corresponding to a maximum number of fragmented MSDUs or A-MSDUs.

In an embodiment, in a case where the length of the block acknowledgement bitmap subfield is set to 64 bytes, the maximum number of corresponding MSDUs or A-MSDUs is 128; in a case where the length of the block acknowledgement bitmap subfield is set to 128 bytes, the maximum number of corresponding MSDUs or A-MSDUs is 256.

According to an aspect of the present disclosure, there is provided a communication method under multiple links, including: receiving a determined first message frame, wherein the first message frame includes a multi-link information element, and the multi-link information element includes information on data fragment transmission; and performing a communication operation based on the first message frame.

In an embodiment, the information includes a first flag bit configured to indicate that data fragmentation is supported, wherein in a case where the first flag bit is set to a first value, the first flag bit is configured to indicate that dynamic data fragmentation is supported; wherein in a case where the first flag bit is set to a second value, the first flag bit is configured to indicate that the dynamic data fragmentation is not supported.

In an embodiment, the first flag bit is included in a multi-link control field of the multi-link information element.

In an embodiment, the information includes a second flag bit configured to indicate that a dynamic fragmentation type is supported.

In an embodiment, the dynamic fragmentation type includes one of a first level dynamic fragmentation, a second level dynamic fragmentation, and a third level dynamic fragmentation.

In an embodiment, the second flag bit is included in a common information field of the multi-link information element.

In an embodiment, the first message frame further includes a high efficiency capability information element, wherein the high efficiency capability information element includes a first flag bit and/or a second flag bit having the same settings as the first flag bit and/or the second flag bit in the multi-link information element.

In an embodiment, the information includes a maximum number of fragmented MAC service data units (MSDUs) or A-MSDUs exponent subfield and a minimum fragment size subfield.

In an embodiment, the maximum number of fragmented MSDUs or aggregation-MSDUs (A-MSDUs) exponent subfield and the minimum fragment size subfield are included in a common information field of the multi-link information element.

In an embodiment, the communication method further includes: receiving a second message frame, wherein the second message frame includes information indicating data fragment transmission in a block acknowledgement mechanism.

In an embodiment, the second message frame includes an add block acknowledgement extension information element, wherein the add block acknowledgement extension information element includes one or more high efficiency fragmentation operation parameters, which include supported dynamic fragmentation types.

In an embodiment, the second message frame includes a block acknowledgement bitmap subfield, wherein a length of the block acknowledgement bitmap subfield is set corresponding to a maximum number of fragmented MSDUs or A-MSDUs.

In an embodiment, in a case where the length of the block acknowledgement bitmap subfield is set to 64 bytes, the maximum number of corresponding MSDUs or A-MSDUs is 128; in a case where the length of the block acknowledgement bitmap subfield is set to 128 bytes, the maximum number of corresponding MSDUs or A-MSDUs is 256.

According to an aspect of the present disclosure, there is provided a communication apparatus under multiple links, including: a processing module, configured to determine a first message frame under any link of the multiple links, wherein the first message frame includes a multi-link information element, and the multi-link information element includes information on data fragment transmission; and a communicating module, configured to transmit the first message frame.

According to an aspect of the present disclosure, there is provided a communication apparatus under multiple links, including: a communicating module, configured to receive a determined first message frame, wherein the first message frame includes a multi-link information element, and the multi-link information element includes information on data fragment transmission; and a processing module, configured to perform a communication operation based on the first message frame.

According to an aspect of the present disclosure, there is provided an electronic apparatus, including a memory, a processor, and a computer program stored in the memory and executable on the processor, wherein the processor implements the communication method described in any implementation.

According to an aspect of the present disclosure, there is provided a computer-readable storage medium storing a computer program, wherein when the computer program is executed by a processor, the communication method described in any implementation is implemented.

The invention claimed is:

1. A communication method for multiple links, comprising:

determining a first message frame for a first link of the multiple links, wherein the first message frame comprises a multi-link information element, and the multi-link information element comprises first information on data fragment transmission; and transmitting the first message frame;

wherein the first information comprises a second flag bit indicating a supported dynamic fragment type.

2. The communication method according to claim 1, wherein the first information comprises a first flag bit indicating that data fragment is supported, wherein it is determined that the first flag bit is set to a first value, and the first flag bit indicates that dynamic data fragment is supported;

wherein it is determined that the first flag bit is set to a second value, and the first flag bit indicates that the dynamic data fragment is not supported.

3. The communication method according to claim 2, wherein the first flag bit is comprised in a multi-link control field of the multi-link information element.

4. The communication method according to claim 1, comprising at least one of:

wherein the dynamic fragment type comprises one of a first level dynamic fragment, a second level dynamic fragment, and a third level dynamic fragment;

wherein the second flag bit is comprised in a common information field of the multi-link information element;

wherein the first information comprises a maximum number of fragmented MAC service data units (MSDUs) or aggregation-MSDUs (A-MSDUs) exponent subfield and a minimum fragment size subfield; or wherein the first message frame further comprises a high efficiency capability information element, wherein the high efficiency capability information element comprises at least one of a first flag bit or a second flag bit, and wherein the high efficiency capability information element comprises the first flag bit, and the first flag bit has same settings as a first flag bit comprised in the multi-link information element; or wherein the high efficiency capability information element comprises the second flag bit, and the second flag bit has same settings as the second flag bit comprised in the multi-link information element; or wherein the high efficiency capability information element comprises the first flag bit and the second flag bit, and the first flag bit and the second flag bit have same settings as the first flag bit and the second flag bit comprised in the multi-link information element.

5. The communication method according to claim 4, wherein the maximum number of the fragmented MSDUs or the A-MSDUs exponent subfield and the minimum fragment size subfield are comprised in a common information field of the multi-link information element.

6. The communication method according to claim 1, further comprising:

transmitting a second message frame, wherein the second message frame comprises second information indicating data fragment transmission in a block acknowledgement mechanism.

7. The communication method according to claim 6, wherein the second message frame comprises an add block acknowledgement extension information element, wherein the add block acknowledgement extension information element comprises one or more high efficiency fragment operation parameters, which comprise supported dynamic fragment types; or wherein the second message frame comprises a block acknowledgement bitmap subfield, wherein a length of the block acknowledgement bitmap subfield is set corresponding to a maximum number of fragmented MAC service data units (MSDUs) or aggregation-MSDUs (A-MSDUs).

8. The communication method according to claim 7, wherein it is determined that the length of the block acknowledgement bitmap subfield is set to 64 bytes, and the maximum number of corresponding fragmented MSDUs or A-MSDUs is 128; or it is determined that the length of the block acknowledgement bitmap subfield is set to 128 bytes, and the maximum number of the corresponding fragmented MSDUs or A-MSDUs is 256.

9. A communication method for multiple links, comprising:

receiving a first message frame, wherein the first message frame comprises a multi-link information element, and the multi-link information element comprises first information on data fragment transmission; and performing a communication operation based on the first message frame;

wherein the first information comprises a second flag bit indicating a supported dynamic fragment type.

10. The communication method according to claim 9, wherein the first information comprises a first flag bit indicating that data fragment is supported, wherein it is determined that the first flag bit is set to a first value, and the first flag bit indicating that dynamic data fragment is supported;

wherein it is determined that the first flag bit is set to a second value, and the first flag bit indicates that the dynamic data fragment is not supported;

wherein the first flag bit is comprised in a multi-link control field of the multi-link information element.

11. The communication method according to claim 9, comprising at least one of:

wherein the dynamic fragment type comprises one of a first level dynamic fragment, a second level dynamic fragment, and a third level dynamic fragment;

wherein the second flag bit is comprised in a common information field of the multi-link information element;

wherein the first information comprises a maximum number of fragmented MAC service data units (MSDUs) or aggregation-MSDUs (A-MSDUs) exponent subfield and a minimum fragment size subfield; or wherein the first message frame further comprises a high efficiency capability information element, wherein the high efficiency capability information element comprises a first flag bit or a second flag bit, and wherein the high efficiency capability information element comprises the first flag bit, and the first flag bit has same settings as a first flag bit comprised in the multi-link information element; or wherein the high efficiency capability information element comprises the second flag bit, and the second flag bit has same settings as the second flag bit comprised in the multi-link information element; or wherein the high efficiency capability information element comprises the first flag bit and the second flag bit, and the first flag bit and the second flag bit have same settings as the first flag bit and the second flag bit comprised in the multi-link information element.

12. The communication method according to claim 11, wherein the maximum number of the fragmented MSDUs or the A-MSDUs exponent subfield and the minimum fragment size subfield are comprised in a common information field of the multi-link information element.

13. The communication method according to claim 9, further comprising:

receiving a second message frame, wherein the second message frame comprises second information indicating data fragment transmission in a block acknowledgement mechanism.

14. The communication method according to claim 13, wherein the second message frame comprises an add block acknowledgement extension information element, wherein the add block acknowledgement extension information element comprises one or more high efficiency fragment operation parameters, which comprise supported dynamic fragment types; or wherein the second message frame comprises a block acknowledgement bitmap subfield, wherein a length of the block acknowledgement bitmap subfield is set corresponding to the maximum number of the fragmented MSDUs or the A-MSDUs.

15. A communication device, comprising a memory, a processor, and a computer program stored in the memory and executable on the processor, wherein when the computer program is executed by the processor, causes the communication device to:

determine a first message frame for a first link of multiple links used in a communication method, wherein the first message frame comprises a multi-link information element, and the multi-link information element comprises first information on data fragment transmission; and transmit the first message frame;

wherein the first information comprises a second flag bit indicating a supported dynamic fragment type.

16. A communication device, comprising a memory, a processor, and a computer program stored in the memory and executable on the processor, wherein when the computer program is executed by the processor, causes the communication device to perform the communication method according to claim 9.

17. A non-transitory computer-readable storage medium storing a computer program, wherein when the computer program is executed by a processor, causes the processor to perform the communication method according to claim 1.

18. A non-transitory computer-readable storage medium storing a computer program, wherein when the computer program is executed by a processor, causes the processor to perform the communication method according to claim 9.

* * * * *